United States Patent [19]

Blad et al.

[11] 4,284,679
[45] Aug. 18, 1981

[54] FILLED RESIN COATED TAPE

[75] Inventors: Leiv H. Blad, Van Nuys; Charles F. Griffin, Burbank, both of Calif.

[73] Assignee: Lockheed Corporation, Burbank, Calif.

[21] Appl. No.: 957,805

[22] Filed: Nov. 6, 1978

[51] Int. Cl.³ ............................................. B32B 7/02
[52] U.S. Cl. ........................................ 428/218; 52/81;
156/220; 264/248; 264/259; 428/212; 428/241;
428/247; 428/251; 428/308; 428/323; 428/325
[58] Field of Search ............... 428/110, 111, 240, 241,
428/246, 247, 286, 315, 317, 323, 324, 325, 909,
415, 515, 308, 218, 212; 52/81; 156/291, 306,
180, 181, 220; 264/116, 81, 248

[56] References Cited

U.S. PATENT DOCUMENTS

| | | | |
|---|---|---|---|
| 2,772,903 | 12/1956 | Sussenbach | 260/42.47 |
| 3,276,895 | 10/1966 | Alford | 428/241 |
| 3,316,139 | 4/1967 | Alford et al. | 428/241 |
| 3,515,625 | 6/1970 | Sedlak et al. | 428/308 |
| 3,582,388 | 6/1971 | Stayner | 428/325 |
| 3,616,143 | 10/1971 | Langloes | 428/240 |
| 3,620,890 | 11/1971 | Kemmler | 428/246 |
| 3,652,380 | 3/1972 | Strack | 260/33.6 AQ |
| 3,700,514 | 10/1972 | Zito | 428/240 |
| 3,707,434 | 12/1972 | Stayner | 428/325 |
| 3,709,966 | 1/1973 | Gambardella | 264/248 |
| 3,769,126 | 10/1973 | Kolek | 428/325 |
| 4,086,378 | 4/1978 | Ham et al. | 428/47 |
| 4,117,185 | 9/1978 | Cummins | 428/246 |

FOREIGN PATENT DOCUMENTS 1370786 10/1974 United Kingdom ..................... 428/246

Primary Examiner—James J. Bell
Attorney, Agent, or Firm—Frederic P. Smith

[57] ABSTRACT

A resinous material suitable for the fabrication of laminated structures comprising a first layer of resin and at least one second layer of filled resin contiguous with the first layer, the second layer being flowable under a compressive force. In the manufacture of a reticulated laminated structure of substantially uniform thickness, the thickness of the second layer varies in accordance with the number of first layers overlying one another at crossover nodes in the reticulated structure, with the second layer flowing from between the plies of the first layer at the nodes due to compressive forces applied to achieve such substantially uniform thickness.

10 Claims, 14 Drawing Figures

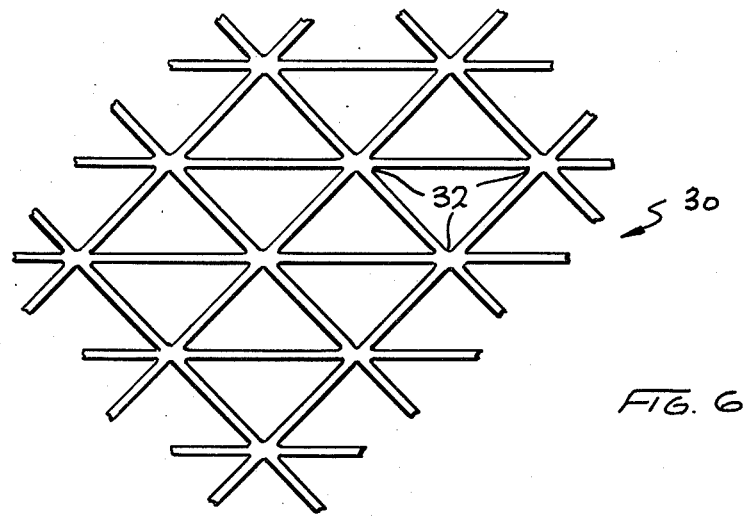
FIG. 6
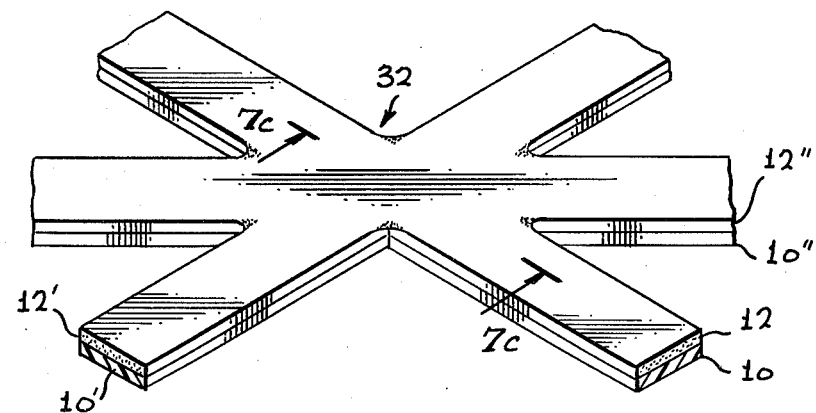
FIG. 7
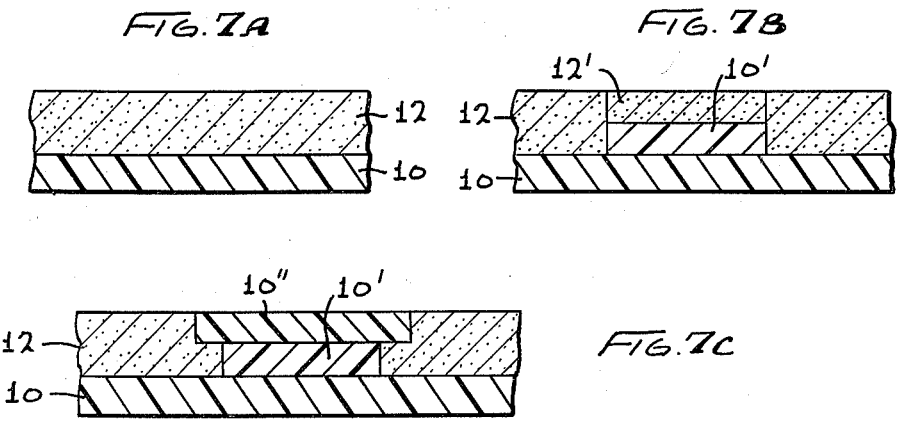
FIG. 7A  FIG. 7B
FIG. 7C

FILLED RESIN COATED TAPE

TECHNICAL FIELD

The invention relates to the field of resinous materials suitable for the fabrication of laminated structures and, in particular, to resinous materials suitable for the fabrication of reticulated laminated structures of substantially uniform thickness.

BACKGROUND OF PRIOR ART

In the manufacture of reticulated structures, such as geodesic structures, it is desirable to be able to take advantage of the unique characteristics of advanced composite materials, such as thermosetting resins, having unidirectional filaments therein oriented parallel to the axis of discrete load paths in such structures. A multiple of laminate bars formed from fibers and resin laid in the above arrangement will result in a redundant structure, with the fibers being continuous and loads being transferred from one bar to another through shear at their intersections. One of the chief requirements in the design and fabrication of viable geodesic structures is the stabilization of the individual plies of the bars between the nodal intersections. If the structure is composed of two intersecting bars, each bar consisting of one or more alternately laid down plies, then there is a gap created between the plies in the bars between the nodal intersections equal in thickness to that of one ply. Similarly, if the structure is composed of three intersecting bars then there is a gap created between the plies in the bars equal in thickness to that of two plies. The resultant structure is thus unstable and also quite non-uniform in thickness. In order to manufacture a reticulated structure which is stable and which is substantially uniform in thickness, any resinous material used to fill the gaps between the plies comprising the bars must completely fill the gaps and must be absent at the nodal intersections. In addition, since the load bearing and transferring capabilities of such resinous material are necessarily low, the presence of such resinous material at the nodal intersections causes the reticulated structure to be substantially weaker. One technique which has been employed to fill the gaps between the plies of the bars between the nodal intersections has been the application of wet resin. It has been found, however, that the resin flows excessively during the process of manufacturing the geodesic structure and that a great many voids occur in the finished laminate arising during the curing cycle. A second technique which has been used is to insert strips of a resinous medium between the plies of the bars between the nodal intersections or to cut away the resinous medium at the intersections. The laying in or cutting away of this resinous medium, however, adds a costly hand-laying step to the fabrication process and also introduces compatibility problems into the cure cycle. It is also quite apparent that the above techniques for fabricating a reticulated structure using resinous materials do not lend themselves readily to continuous winding or tape-laying procedures.

Accordingly, it is a general object of the present invention to provide a resinous material suitable for the fabrication of laminated structures.

It is another object of the present invention to provide a resinous material suitable for the fabrication of reticulated structures having a substantially uniform thickness.

It is a further object of the present invention to provide a resinous materials which can be used in a winding or tape-laying process for the fabrication of reticulated structures having a substantially uniform nodal and internodal thickness.

SUMMARY OF THE INVENTION

A resinous material suitable for the fabrication of laminated structures is provided. The material comprises a first layer of resin and at least one second layer of filled resin contiguous with the first layer, the second layer being flowable under a compressive force. In the fabrication of laminated reticulated structures of substantially uniform thickness, the thickness of the second layer varies in accordance with the number of first layers overlying one another at crossover nodes in the reticulated structure, with the second layer being flowable under the compressive forces used in the fabrication process to achieve the substantially uniform thickness. The first layer may have fibers preimpregnated therein for additional strength. An interfacial scrim may be provided between the first and second layers to prevent the filled resin from oozing up through the first layer when pressure is applied.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

FIG. 6 is a plan view of a planar reticulated structure with a three element intersection utilizing the present invention.

FIG. 7 is an enlarged fragmentary perspective view of a nodal intersection of the structure of FIG. 6.

FIGS. 7A–7C illustrate in cross-section the layup process occurring at the nodal intersection shown in FIG. 7, with FIG. 7C being taken along the line 7C—7C of FIG. 7.

DESCRIPTION OF THE PREFERRED EMBODIMENTS

Figure 1:
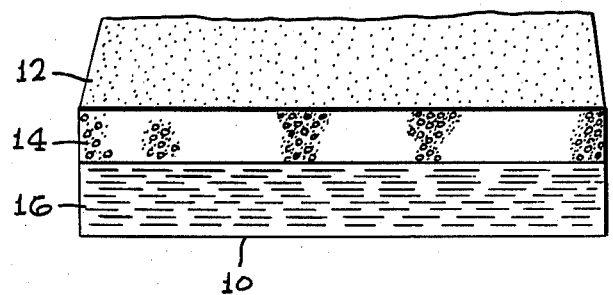
FIG. 1 is a perspective view of a first embodiment of the present invention.

Referring now to FIG. 1 a perspective view of a first embodiment of the resinous material of the present invention is illustrated. A layer or sheet of thermoplastic or thermosetting resin 10 is shown coated with a layer or sheet of filled resin 12, often referred to as a layer of syntactic resin. The filled resin layer 12 has embedded therein a plurality of particles 14 which may, for example, be glass microballoons having a diameter of approximately 60 microns, beads, mica or short staple fibers, and consists of a resin which is flowable under a compressive force. Flowability may be enhanced by the application of heat, as for example 120° F., to the filled resin layer 12 during the application of the compressive force. The layer of resin 10 is generally on the order of 0.007 to 0.010 inches in thickness and assumes a thickness of 0.005 inches when finally cured. The layer of filled resin 12 generally has a thickness of 0.005 inches times n, where n-1 is the number of resin layers 10 that would intersect at a node when, as explained hereafter, the resinous material of the present invention is cut into tape form to build planar reticulated structures or geodesic structures. The material is generally prepared in continuous lengths approximately 3 inches wide and then sliced to widths of 0.1 to 0.5 inches wide to be used as a tape for such structures; the tape, however, may be made in greater or narrower widths. As shown in FIG. 1, the resin layer 10 may also include therein fibers 16, such as graphite, oriented to give the resin layer 10 increased structural strength. Typical thermoplastic or thermosetting resins which may be used for the resin layer 10 are polycarbonate and epoxy resins and a typical resin which may be used for the filled layer 12 is an epoxy resin, which filled layer 12 may be filled with 30% by weight of microballoons.

Figure 2:
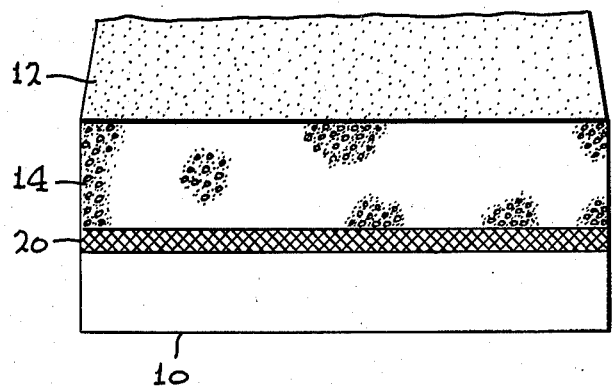
FIG. 2 is a perspective view of a second embodiment of the present invention.
Figure 3:
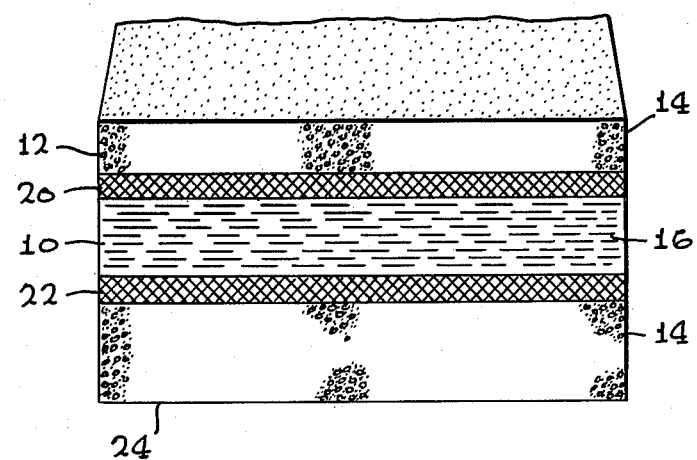
FIG. 3 is a perspective view of a third embodiment of the present invention.

In FIG. 2 a second embodiment of the resinous material of the present invention is illustrated in which the resin layer 10 and the filled resin layer 12 are separated by an interfacial tight weave scrim 20 which is used to prevent the filled resin from oozing up through the resin layer 10 when pressure is applied to build the reticulated structures as described hereafter. The interfacial scrim 20 has a thickness of 0.002 to 0.003 inches and is composed of a plastic material, such as fiberglass, compatible with the resin systems from which the layers 10 and 12 are formed. It should be noted that the resin layer 10 has no fibers 16 therein and is useful for those applications where a load bearing capability is not necessary, such as when used as a membrane. The type of fibers 16 used in the layer 10 will depend on the application to which the material is being used and, in particular, whether the load is a compression load, a torsion load, a tensile load or a shear load. The The thickness of the layer 12 is FIG. 2 is shown to be twice the thickness of the layer 10 and is suitable for applications where the crossover node is a three bar intersection. In FIG. 3 a third embodiment of the invention is illustrated in which the layer 10 has scrims 20 and 22 on either side thereof and filled layers 12 and 24 adjacent to the scrims 20 and 22. The filled layers 12 and 24 have microballoons 14 therein with filled layer 12 being the same thickness as layer 10 and filled layer 24 being twice the thickness of layer 10, the particular structure being suitable for use in a reticulated structure having a four bar intersection. Layer 10 is also shown as having a plurality of graphite or other types of fibers 16 therein.

The embodiments illustrated in FIGS. 1, 2, and 3 may be manufactured by a variety of methods. In one method the filled resin 12 and the filler 14 can be sprayed by a two-nozzle system onto the resin layer 10 in proper proportions with the materials being mixed in the air as they exit the nozzles. The film and filled coating are then passed through a set of rollers to assure the proper thickness. In another method, the filled resin layer 12 can be prepared by mixing a known weight of filler materials 14 with a measured amount of thermosetting resin. The resin layer 10 is then drawn through a set of rollers with a mass of the filled resin material being placed at the top of the juncture of the rollers. The rollers are spaced at such a distance that when the layer 10 is drawn through the opening a proper amount of filled resin material is deposited on the resin layer 10 to form the layer 12. Alternately, the filled resin material could be deposited on the resin layer 10 and the layer 12 drawn under a doctor blade. As the layer 12 is drawn through the opening under the doctor blade a correct amount of the filled resin material would be left on the resin layer 10 to form the layer 12. If it is desired to use scrim 20, scrim 20 would merely be placed on the resin layer 10 prior to the application of the filled resin material.

Figure 4:
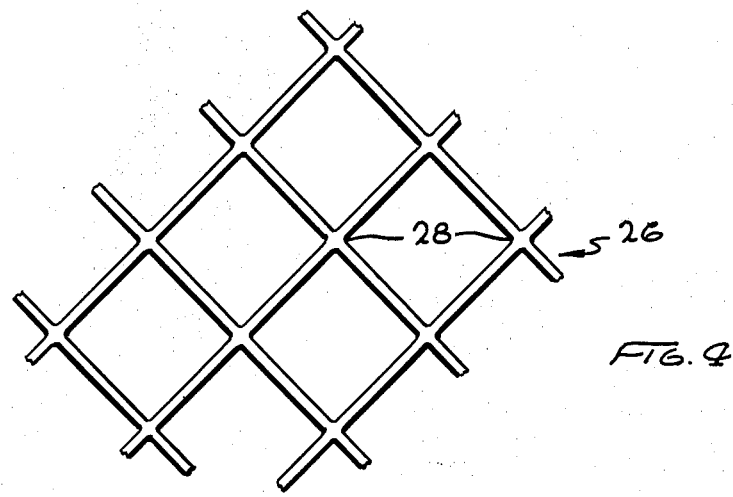
FIG. 4 is a perspective view of a planar reticulated structure with a two bar intersection utilizing the present invention.
Figure 5:
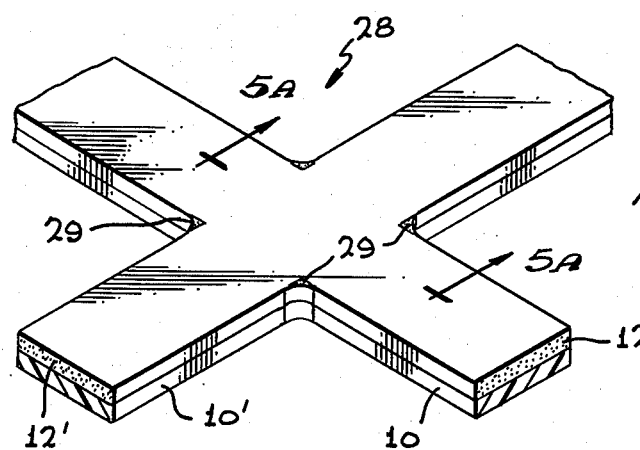
FIG. 5 is an enlarged fragmentary perspective view, partially in section, of a nodal intersection of the structure of FIG. 4.
Figure 5A:
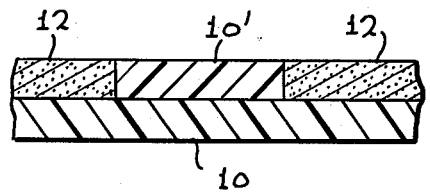
FIG. 5A is a cross-sectional view taken along the line 5A—5A of FIG. 5.

In FIG. 4, a planar reticulated structure 26 with a plurality of two bar intersections 28 utilizing the present invention is illustrated. The structure 26 is composed of a multiplicity of sheets of material, such as shown in FIG. 1, cut into a plurality of tape-like strips and overlayed to give the desired structural strength and integrity. The structure 26 is generally formed by laying a first strip of the tape in a first direction, a second strip of the tape in a second direction, a third strip of the tape again in the first direction and so forth. Since the structure 26 has a two bar intersection, the thickness of the structure 26 at the intersection 28 for each pair of intersecting strips of tape can be only the thickness of two of the resin layers 10 for a structure 28 of uniform thickness. Since the syntactic resin layer 12 is flowable under compression, a sufficient force is applied at each nodal intersection 28 to cause the syntactic resin layers 12 at the intersection 28 to be flowed out under such compressive force to leave only a two-layer structure at the intersection 28. It is obvious that in the regions between the intersections 28, which contain only one strip of tape, the combination of the resin layer 10 and the filled resin layer 12 form a thickness equal to the thickness of two of the layers 10 at the nodal intersections 28. The resultant structure at any one of the nodal intersections 28 of the reticulated structure 26 for a pair of intersecting strips of tape is illustrated in FIGS. 5 and 5A. The nodal intersection 28 illustrated in FIG. 5 is composed of a first layer 10 with a first filled layer 12 thereon and a second layer 10' with a second filled layer 12' thereon. As is evident, the layer 10' crosses over layer 10 which has been placed down first at the nodal intersection 28. With the application of pressure (and heat, if necessary) both the filled layers 12 and 12' have been squeezed out of the intersection 28, to the extent of approximately 92% thereof, and have flowed into regions 29 adjacent the point of intersection of the two strips. Outside of the intersection 28 both of the filled layers 12 and 12' continue to remain in their unaltered form so that the intersection 28 and the strips exiting therefrom are of uniform thickness.

In FIG. 6 a plan view of a planar reticulated structure 30 with a plurality of three bar intersections 32 utilizing the present invention is illustrated. The structure 30 is built by first laying one complete set of strips of tape in a first direction, a complete set of strips of tape in a second direction, a complete set of strips of tape in a third direction, a second complete set of strips of tape again in the first direction and so forth. Since the structure 30 comprises a three bar intersection, each of the filled resin layers 12, is twice as thick as the layer 10, and the structure 30 can be composed of a multiplicity of strips of material such as shown in FIG. 2.

A typical nodal intersection 32 of the structure 30 for three intersecting plies is shown in FIG. 7. In order to get the reticulated structure 30 to be of a uniform thickness, pressure is applied to each of the tapes as it is laid down by, for example, a roller following a tape laying guide and designed to place a pressure of 25 psi at the nodal intersections 32, with the height of the roller being set for a three layer of tape thickness configuration. During the application of the first set of layers 10, 12, as shown in FIG. 7A, the thickness of the first set of layers would remain unaffected by the use of such roller. During the application of the second set of layers 10', 12' the combined thicknesses of the first set of layers 10, 12 and the second set of layers 10', 12' would be six thicknesses, two thicknesses comprising the individual layers 10, 10' and four thicknesses comprising the individual layers 12, 12'. As the roller crosses each intersection, the four thicknesses of the layers 12, 12' would be compressed to a single thickness so that the resultant thickness at the intersection 32 would be three thicknesses comprised of two thicknesses of layers 10, 10' and one thickness of layer 12'. The resultant structure after two layers have been laid down is shown in cross section in FIG. 7B. The application of the third set of layers 10", 12" will again result in a six thickness configuration at the intersection 32, comprised essentially of three thicknesses of layers 10, 10' and 10", a single remaining thickness of layer 12 and a two layer thickness of layer 12". After the application of the roller through the intersection 32, all of the filled layers 12' and 12" will have been squeezed out leaving only the layers 10, 10' and 10", as shown in FIG. 7C. Thus, each of the intersections 32, for three intersecting plies, will have a three thickness configuration comprised of layers 10, 10' and 10" and each of the connecting segments between the nodal intersections 32 will also have a three thickness configuration comprised of a single thickness of layers 10, 10' or 10" and a two layer thickness thereon of layers 12, 12' or 12".

Figure 8:
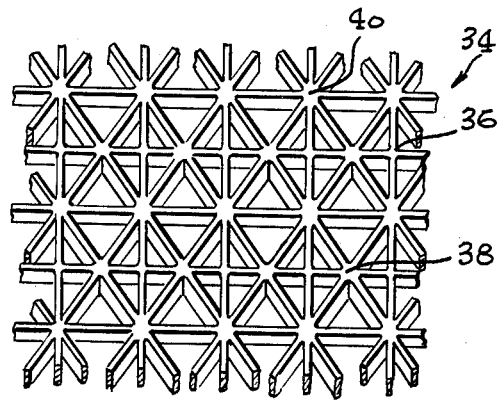
FIG. 8 is a perspective view of a planar reticulated structure with two, three and four bar intersections utilizing the present invention.

In FIG. 8, a planar reticulated structure 34 is illustrated having two, three, and four bar intersections. Because of the use of four bar intersections, a tape such as shown in FIG. 3 would be utilized having a single thickness of layer 10 and a three-fold thickness of filled resin thereon consisting of layers 12 and 24. The amount of filled resin squeezed out of each of the intersections will, of course, depend upon the number of bars crossing at each intersection. For example, at intersection 36 where two bars cross the final nodal structure, for each set of intersecting plies will consist of two thicknesses of the resin layer and two thicknesses of the filled resin layer. At intersection 38 where three bars cross, the final nodal configuration, for each set of intersecting plies will consist of three thicknesses of the resin layer and one thickness of the filled resin layer. Finally, at intersection 40 where four bars cross, the final nodal configuration, for each set of intersecting plies, will consist of four thicknesses of the resin layer and no thicknesses of the filled resin layer, all of the material in the filled resin layer 12 having been squeezed out into the region surrounding the nodal intersection 40.

Figure 9:
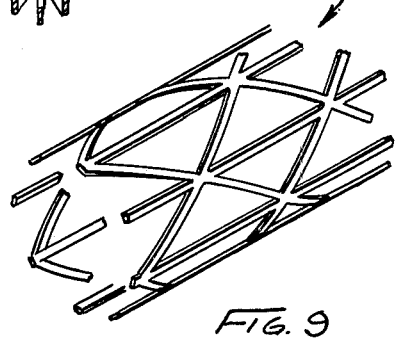
FIG. 9 is a fragmentary perspective view of a cylindrical geodesic structure utilizing the present invention.
Figure 10:
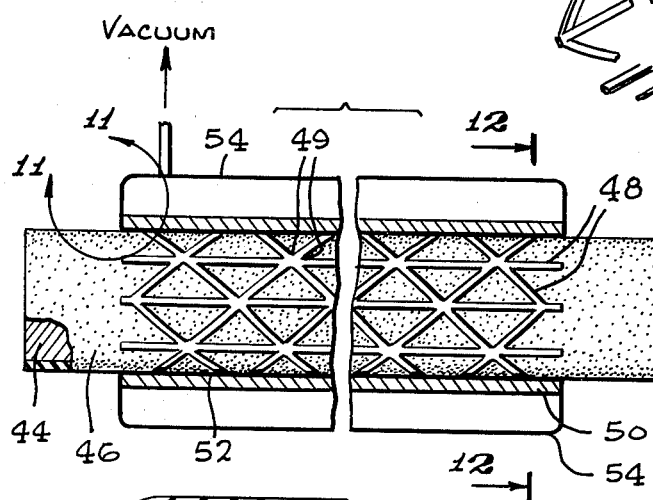
FIG. 10 illustrates the tooling utilized to fabricate the structure of FIG. 9.
Figure 11:
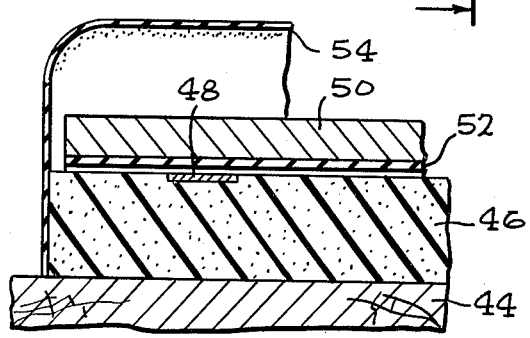
FIG. 11 is an enlarged fragmentary view of the encircled portion 11—11 of the tooling of FIG. 10.
Figure 12:
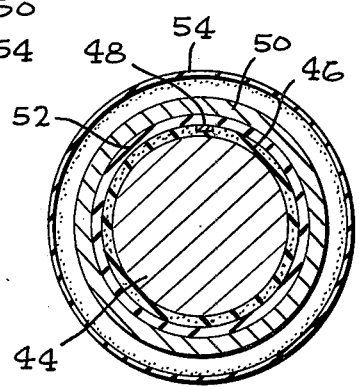
FIG. 12 is a cross-sectional view of the tooling of FIG. 10 taken along the line 12—12 of FIG. 10.

In FIG. 9 a fragmentary perspective view of a cylindrical geodesic structure utilizing the present invention is illustrated. The geodesic structure 42 is comprised of three bar intersections such as those shown in the structure 30 of FIG. 6 and is laid up in approximately the same manner. FIGS. 10, 11, and 12 illustrate the tooling and the method utilized to fabricate the cylindrical geodesic structure 42 of FIG. 9. Referring now to FIGS. 10, 11 and 12, a wood mandrel 44 cylindrical in form is covered with a rubber surface 46 containing a series of grooves 48 which are oriented in the specific pattern defining the geodesic structure 42. Strips of resin and filled resin layers 10, 12 are laid into the grooves 48 and continuously wound around the mandrel 44 and the rubber surface 46 in the manner described in the construction of element 30 with the syntactic resin being squeezed out of the nodal intersections as the strips are overlaid upon one another. As is shown in FIG. 10, regions 49 for flow-out of the syntactic resin are provided at each nodal intersection. A set of female cylindrical tools 50, composed of steel or aluminum and lined with rubber 52, is assembled around the mandrel 44 and the rubber surface 46. A vacuum bag 54 enclosing the female tool 50 is then sealed to the rubber surface 46 and a vacuum is drawn. The vacuum causes the rubber surface 46 to be drawn upwards in tight proximity to the female tool 50 while, of course, the bag 54 itself is drawn down against the female tool 50. The mandrel 44 is then removed and the entire assembly is placed in an autoclave to be cured, for example, at 250° F., 100 psi and full vacuum for one hour to cause the resin to polymerize, the laminate intersections to be compacted, any excess resin to be removed and any gaseous components to be eliminated.

Having thus described the invention, it is obvious that numerous modifications and departures may be made by those skilled in the art; thus, the invention is to be construed as being limited only by the spirit and scope of the appended claims.

INDUSTRIAL APPLICATION

The resinous sheet material is useful in the manufacture of reticulated laminated structures of uniform thickness.

I claim:

1. A resinous material suitable for the fabrication of laminated structures comprising:
   a first layer of resin; and
   at least one second uncured and substantially non-self-curing layer of filled resin contiguous with said first layer, said first layer being relatively non-compressible compared to said second layer and said second layer being readily flowable under a compressive force and adapted to be easily squeezed out of the region of the force, said flowable second layer being adapted to retain said flowability for an extended period of time until used to fabricate said laminated structures.

2. The material of claim 1 wherein said first layer is a thermosetting resin.

3. The material of claim 1 wherein said first layer is a thermoplastic resin.

4. The material of claim 1 wherein said first layer has fibers preimpregnated therein.

5. The material of claim 1 wherein said first and second layers have an interfacial scrim therebetween.

6. The material of claim 1 wherein said second layer is a thermosetting resin.

7. The material of claim 1 wherein said second layer is filled with microballoons.

8. The material of claim 1 wherein said first and second layers form a continuous tape.

9. A reticulated structure of substantially uniform thickness comprising a plurality of contiguous layers of resin and filled resin, the thickness of said filled resin layers varying in accordance with the number of resin layers overlying one another at nodal intersections in said reticulated structure, said filled resin layers being flowable under compressive force.

10. The method of manufacturing a reticulated structure of substantially uniform thickness comprising the steps of:
- laying in a preselected pattern a first layer of material consisting of contiguous layers of resin and filled resin;
- laying over said first layer of material in a preselected pattern a second layer of material consisting of contiguous layers of resin and filled resin, whereby nodal intersections of said first and second layers are formed; and
- applying a compressive force to said first and second layers at said nodal intersections to remove from said nodal intersections a preselected amount of said filled resin.

* * * * *